United States Patent
Krichevsky (10) Patent No.: US 8,908,480 B1
(45) Date of Patent: Dec. 9, 2014

(54) METHOD AND SYSTEM FOR PROVIDING AN ENERGY ASSISTED MAGNETIC RECORDING DISK DRIVE USING A PULSED LASER LIGHT

(71) Applicant: Western Digital Technologies, Inc., Irvine, CA (US)

(72) Inventor: Alexander Krichevsky, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 92 days.

(21) Appl. No.: 13/631,493

(22) Filed: Sep. 28, 2012

(51) Int. Cl.
G11B 5/02 (2006.01)

(52) U.S. Cl.
USPC .................. 369/13.13; 369/13.24; 369/13.32

(58) Field of Classification Search
None
See application file for complete search history.

(56) References Cited

U.S. PATENT DOCUMENTS

| | | | |
|---|---|---|---|
| 6,801,240 B2 | 10/2004 | Abe et al. | |
| 6,989,550 B2 | 1/2006 | Nakahara et al. | |
| 7,136,328 B2 | 11/2006 | Miyaoka | |
| 7,317,665 B2 | 1/2008 | Watanabe et al. | |
| 7,538,978 B2 | 5/2009 | Sato et al. | |
| 2004/0105476 A1 | 6/2004 | Wasserbauer | |
| 2011/0205861 A1 | 8/2011 | Erden et al. | |
| 2012/0113770 A1* | 5/2012 | Stipe | 369/13.33 |

* cited by examiner

Primary Examiner — Wayne Young
Assistant Examiner — Brian Butcher (57) ABSTRACT

A method and system provide an energy assisted magnetic recording (EAMR) disk drive. The EAMR disk drive includes a media, at least one laser coupled with the slider, at least one EAMR head on the slider, and at least one electro-optical modulator (EAM) The EAM(s) are optically coupled with the laser(s) and coupled with the slider. The combination of the laser(s) and EAM(s) provide a pulsed energy output. The EAMR head(s) include at least one waveguide, a write pole, and at least one coil for energizing the write pole. The waveguide(s) receive the pulsed energy output and direct the pulsed energy output toward the media.

36 Claims, 8 Drawing Sheets

METHOD AND SYSTEM FOR PROVIDING AN ENERGY ASSISTED MAGNETIC RECORDING DISK DRIVE USING A PULSED LASER LIGHT

BACKGROUND

Figure 1:
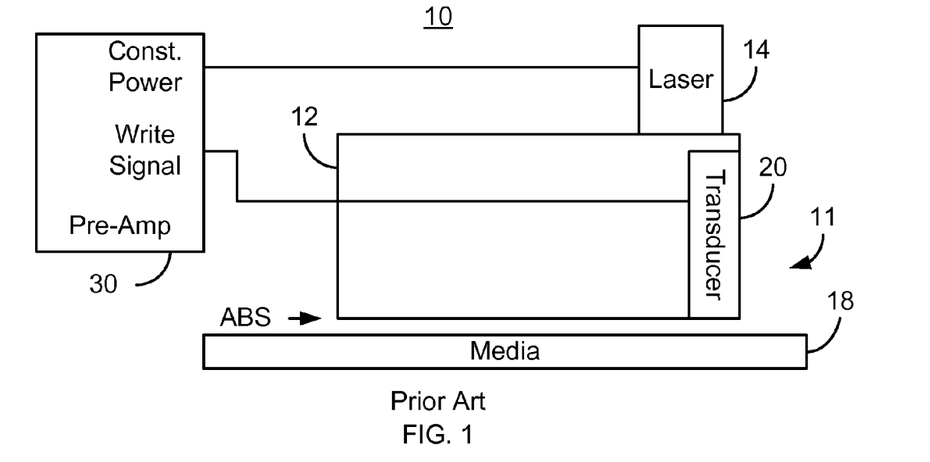
FIG. 1 depicts a side view of a conventional EAMR disk drive.

FIG. 1 depicts a side view of portion of a conventional energy assisted magnetic recording (EAMR) disk drive 10. For clarity, FIG. 1 is not to scale. For simplicity not all portions of the EAMR disk drive 10 are shown. The EAMR disk drive 10 includes an EAMR head 11 including a slider 12 and a transducer 20. THE EAMR disk drive 10 also includes a laser/light source 14, media 18, a transducer 20, and preamplifier and associated circuitry 30. The laser 14 is typically a laser diode. Although shown as mounted on the slider 11, the laser 14 may be coupled with the slider 11 in another fashion. For example, the laser 11 might be mounted on a suspension (not shown in FIG. 1) to which the slider 11 is also attached. The media 18 may include multiple layers, which are not shown in FIG. 1 for simplicity.

The EAMR head 11 includes an EAMR transducer 20. The EAMR head 11 may also include a read transducer (not shown in FIG. 1). The read transducer may be included if the EAMR head 11 is a merged head. The EAMR transducer 20 includes optical components (not shown in FIG. 1) as well as magnetic components (not shown in FIG. 1).

Also shown in conventional pre-amplifier 30. As shown in FIG. 1, the pre-amplifier 30 is typically located remote from the slider 12. For example, the pre-amplifier may reside on a flexible printed circuit board (actuator flex). The actuator flex provides mechanical and electrical connection between a system on a chip (SOC) including other electronics and the slider 12, which is typically mounted on the actuator flex. The conventional pre-amplifier 30 typically provides DC power for the conventional laser diode 14 and power for the transducer 20. For the transducer 20, the pre-amplifier 30 may be connected by two lines for a fly height sensor that helps determine the distance between the ABS and the media, one to two lines for a fly height control heater and ground, two lines for read data, and two lines for the write data.

In operation, the pre-amplifier 30 provides a constant power signal to the laser 14 during writing. Thus, the laser 14 remains on throughout the write operations. The laser 14 provides a constant source of energy, which is used to heat small regions of the media 18. The pre-amplifier 30 also provides write signals to the transducer 20. The write signals selectively energize one or more coils (not shown in FIG. 1). These coils energize a write pole (not shown in FIG. 1). The transducer 20 then magnetically writes to the media 18 in the heated region.

Although the conventional EAMR disk drive 10 functions, it is desirable to reduce power consumption of the EAMR disk drive 10. For example, a conventional near-field transducer (NFT) (not shown) is typically used to focus light from the conventional laser 14 onto the media 18. However, the conventional NFT is subject to overheating during use. The NFT may thus deform, melt, or corrode. Further, the lateral thermal gradient in the media 18 may be lower than desired. Stated differently, the temperature of the media 18 does not fall off sufficiently quickly in the cross track direction from the region being heated. Thus, the track widths recorded by the conventional EAMR transducer 20 may be wider than desired. Consequently, a mechanism for controlling the power consumed by the conventional EAMR disk drive 10 is desired.

Accordingly, what are needed are improved methods and systems for controlling power consumption in EAMR disk drives.

BRIEF SUMMARY OF THE INVENTION

A method and system provide an energy assisted magnetic recording (EAMR) disk drive. The EAMR disk drive includes a media, at least one laser coupled with the slider, at least one EAMR head on the slider, and at least one electro-optical modulator (EAM) The EAM(s) are optically coupled with the laser(s) and coupled with the slider. The combination of the laser(s) and EAM(s) provide a pulsed energy output. The EAMR head(s) include at least one waveguide, a write pole, and at least one coil for energizing the write pole. The waveguide(s) receive the pulsed energy output and direct the pulsed energy output toward the media.

DETAILED DESCRIPTION OF THE EXEMPLARY EMBODIMENTS

One mechanism for controlling power consumption in an EAMR disk drive is to modulate the current to a laser, such as the conventional laser 14. Thus, instead of providing DC power to the laser, the current is pulsed. Although this technology is promising, there are drawbacks. Circuitry for pulsing current to a laser at sufficiently high frequencies may be more expensive than is desired for disk drive technology. In addition, the pulsed current may introduce jitter into the output of the laser. The jitter is due to the random onset of the avalanche transition once the inverted population of excited/ground state electrons is achieved in the lasing media within the laser. This jitter may be mitigated by ensuring that the laser is operated above the threshold current at all times. However, the jitter may still be larger than desired for operation of the EAMR disk drive.

Figure 2:
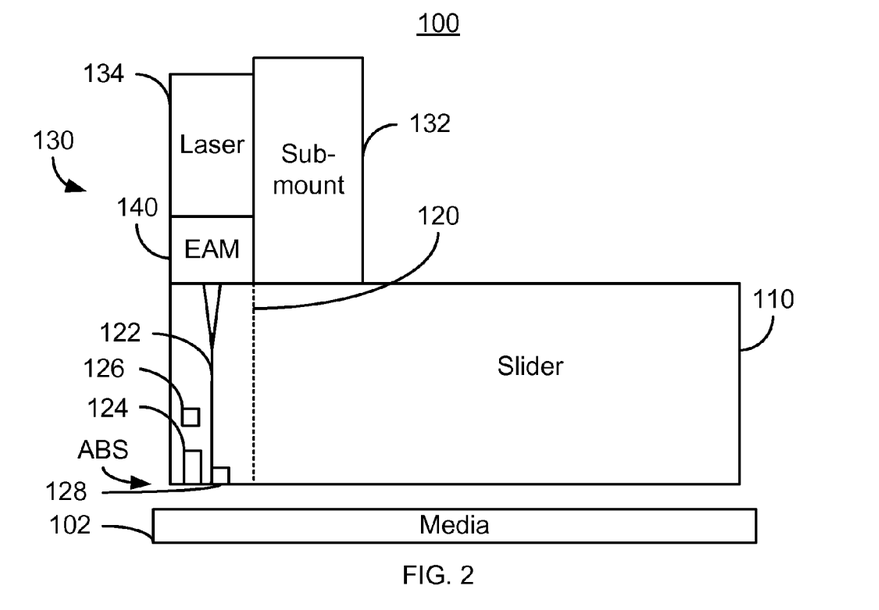
FIG. 2 depicts a side view of an exemplary embodiment of a portion of an EAMR disk drive that utilizes pulsed laser light.

FIG. 2 depicts a side view of an exemplary embodiment of a portion of an EAMR disk drive 100 that may be operated using pulsed laser energy. For clarity, FIG. 2 is not to scale. For simplicity not all portions of the EAMR disk drive 100 are shown. In addition, although the EAMR disk drive 100 is depicted in the context of particular components other and/or different components may be used. For example, circuitry used to drive and control various portions of the EAMR disk drive 100 is not shown. For simplicity, only single components 102, 110, 120, 130 and 140 are shown. However, multiples of each components 102, 110, 120, 130 and/or 140 and their sub-components, might be used.

The EAMR disk drive 100 includes media 102, a slider 110, an EAMR head 120, a laser assembly 130 and an electro-absorption modulator (EAM) 140. Additional and/or different components may be included in the EAMR disk drive 100. Although not shown, the slider 110, and thus the laser assembly 130 and EAMR transducer 120 are generally attached to a suspension (not shown). The EAMR transducer 120 is fabricated on the slider 110 and includes an air-bearing surface (ABS) proximate to the media 102 during use.

In general, the EAMR head 120 includes a write transducer and a read transducer. However, for clarity, only the write portion of the EAMR head 120 is shown. The EAMR head 120 includes a waveguide 122, write pole 124, coil(s) 126 and near-field transducer (NFT) 128. In other embodiments, different and/or additional components may be used in the EAMR head 120. The waveguide 122 guides light to the NFT 128, which resides near the ABS. The NFT 128 utilizes local resonances in surface plasmons to focus the light to magnetic recording media 102. At resonance, the NFT 128 couples the optical energy of the surface plasmons efficiently into the recording medium layer of the media 102 with a confined optical spot which is much smaller than the optical diffraction limit. This optical spot can rapidly heat the recording medium layer to near or above the Curie point. High density bits can be written on a high coercivity medium with the pole 124 energized by the coils 126 to a modest magnetic field.

The laser assembly 130 includes a submount 132 and a laser 134. The submount 132 is a substrate to which the laser 134 may be affixed for improved mechanical stability, ease of manufacturing and better robustness. The laser 134 may be a chip such as a laser diode. Thus, the laser 134 typically includes at least a resonance cavity, a gain reflector on one end of the cavity, a partial reflector on the other end of the cavity and a gain medium. For simplicity, these components of the laser 134 are not shown in FIG. 2. In some embodiments, the laser 134 may be an edge emitting laser, a vertical surface emitting laser (VCSEL) or other laser. The laser 134 emits energy on a side/edge facing the waveguide 122.

The EAMR disk drive 100 also includes the electro-absorption modulator 140, which may be considered a type of electro-optical modulator 140. The EAM 140 may include a semiconductor or a multilayer having multiple quantum wells (MQW). In some embodiments, the EAM 140 is a Bragg EAM. The EAM 140 may be integrated onto the same chip as the laser 134 or may be a separate component. When integrated into the same chip as the laser 134 or affixed to the submount 132, the EAM 140 may be part of the laser assembly 130. In other embodiments, the EAM 140 may be integrated into the slider 110. In addition, the EAM 140 may be a tapered EAM, described below. The EAM 140 may also be small and inexpensive enough to be incorporated into the EAMR disk drive. As shown in FIG. 2, the EAM 140 resides between the output of the laser 134 and the waveguide 122. To control operation of the EAM 140, and thus the pulsing of the output of the EAM 140-laser 134 combination, voltage is provided to the EAM 140 via pads (not shown). Depending upon the location of the EAM 140 and the specifics of the embodiment, these pads may be integrated into the laser assembly 130, onto the laser 134, and/or in the slider 110.

The combination of the laser 134 and the EAM 140 provide a pulsed energy output to the waveguide 122. More specifically, the EAM 140 modulates the intensity of the laser output. In some embodiments, the EAM 140 does so by alternately introducing charge carriers (e.g. electrons) into the region between the emission exit of the laser 134 and the waveguide 122. The electrons absorb light from the laser 134, which may alternately reduce (or eliminate) energy transmitted to the waveguide 122. In other embodiments, such as an MQW EAM, the EAM 140 can alternately change is reflective properties. Thus, light energy is alternately reflected back to the laser 134 and transmitted to the waveguide 122. In either embodiment, the output of the combination of the laser 134 and EAM 140 is pulsed energy. In some embodiments, the EAM 140 may be capable of operating up to at least the 5-10 GHz range and may have a low insertion loss. The EAM 140 may also require a relatively low voltage and low current for operation. For example, the EAM 140 may operate in the 2-4 volt range. Thus, a pulsed energy may be output to the waveguide 140 at frequencies of up to at least the 5-10 GHz range without requiring high voltages to be provided to the EAM 140. Such frequencies are generally considered sufficient for higher density recording.

In operation, the laser 134 emits light, which may be DC emission. This light is modulated by the EAM 140 to provide pulsed light to the waveguide 122. The waveguide 122 directs the pulsed light to the NFT 128. The NFT 128 focuses the pulsed light to a region of magnetic recording media 102 using surface plasmons. The NFT 128 thus couples the optical energy of the pulsed light into the recording medium layer of the media 102 with a confined optical spot that is much smaller than the optical diffraction limit. This optical spot can typically heat the recording medium layer above the Curie point in nano-seconds. High density bits can be written on a high coercivity medium with the pole 124 energized by the coils 126 to a modest magnetic field.

The EAMR disk drive 100 may have improved performance and reliability. Using the EAM 140, pulsed laser energy may be provided to the waveguide 122 while operating the laser 134 in a DC mode. The laser 134 receives a DC current and provides a constant output that may be less subject to jitter. Note, however, that a higher power is still consumed by the laser 134. Because the EAM 140 modulates the output of the laser 134, pulsed energy is provided to the waveguide 134. The energy provided to the NFT 128 is also pulsed. The NFT 128 is thus less likely to overheat. Consequently, deformation and other heat related issues for the NFT 128 may be mitigated. In addition, the pulsed energy may result in an improved gradient in the thermal spot size on the media 102. A narrower track width may thus be achieved. Further, the EAM 140 may have improved temporal control over the width of the pulses. Consequently, performance and reliability of the EAMR disk drive 100 may be improved.

Figure 3:
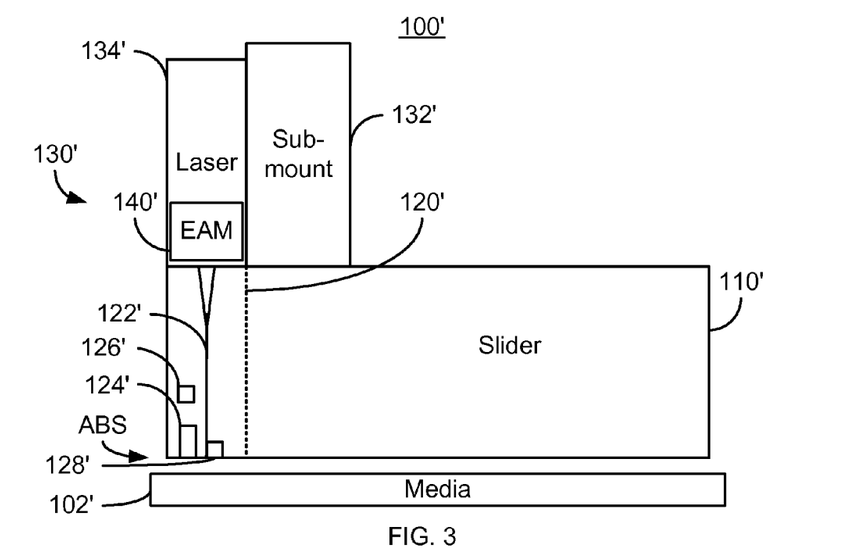
FIG. 3 depicts top and side views of an exemplary embodiment of a portion of an EAMR disk drive that utilizes pulsed laser light.

FIG. 3 depicts an exemplary embodiment of a portion of an EAMR disk drive 100' that utilizes pulsed laser energy. FIG. 3 is not to scale. Although the EAMR disk drive 100' is depicted in the context of particular components additional, other and/or different components may be used. The EAMR disk drive 100' is analogous to the EAMR disk drive 100. Consequently, the EAMR disk drive 100' includes a media 102', a slider 110', a head 120', a laser assembly 130' and an EAM 140 that are analogous to the media 102, slider 110, EAMR head 120, laser assembly 130, and EAM 140, respectively. For clarity, only a portion of the EAMR disk drive 100' is shown.

The EAMR head 120' includes a waveguide 122', write pole 124', coil(s) 126' and NFT 128' that are analogous to the waveguide 122, write pole 124, coil(s) 126 and NFT 128, respectively. The structure and function of the waveguide 122', write pole 124', coil(s) 126' and NFT 128' are thus analogous to those of the waveguide 122, write pole 124, coil(s) 126 and NFT 128, respectively. The laser assembly 130' includes a submount 132' and a laser 134'. The submount 132' is analogous to the submount 132 and thus has similar a structure and function.

The laser 134' may be a chip such as a laser diode and may be analogous to the laser 134. Thus, the laser 134' includes at least a resonance cavity, a gain reflector on one end of the cavity, a partial reflector on the other end of the cavity and a gain medium. For simplicity, these components of the laser 134' are not shown in FIG. 3. In some embodiments, the laser 134' may be an edge emitting laser, a vertical cavity surface emitting laser (VCSEL) or other laser. The laser 134' emits energy on a side/edge facing the waveguide 122'.

The EAMR disk drive 100' also includes the EAM 140'. The EAM 140' may include a semiconductor or a multilayer having multiple quantum wells. In some embodiments, the EAM 140' is a Bragg EAM. The EAM 140' has an analogous structure and function to the EAM 140. The EAM 140' may also require a relatively low voltage and low current for operation and may operate at frequencies sufficient for high density recording. The EAM 140' may also be sufficiently small and inexpensive to be incorporated into the EAMR disk drive 100'. To control operation of the EAM 140', and thus the pulsing of the output the laser 134', voltage is provided to the EAM 140' via pads (not shown).

Although generally analogous to the EAM 140, the EAM 140' is incorporated into the laser 134' rather than between the laser 134 and the waveguide 122 as is shown in FIG. 2. The EAM 140' thus resides within the cavity of the laser 134' and modulates the laser 134' itself. For example, the EAM 140' may reside within the cavity near the gain mirror. The EAM 140' may alternately introduce charge carriers (e.g. electrons) into the cavity of the laser 134'. The electrons absorb energy, which may alternately reduce gain for the laser 134', resulting in the laser 134' outputting pulses only when gain is high. In other embodiments, the EAM 140' may alternately change is reflective properties to "spoil" the gain mirror. Again, the output of the laser 134' is pulsed energy. In either embodiment, the EAM 140' and laser 134' may be controlled such that the gain media remains in an excited state between pulses. As a result, energy with the laser 134' may be considered to be conserved and power dissipated by the laser 134' reduced.

In operation, the laser 134' emits pulses of light due to the modulation provided by the EAM 140'. The waveguide 122' directs the pulsed light to the NFT 128'. The NFT 128' focuses the pulsed light to a region of magnetic recording media 102' using surface plasmons. The NFT 128' thus couples the optical energy of the pulsed light into the recording medium layer of the media 102' with a confined optical spot that is much smaller than the optical diffraction limit. This optical spot can typically heat the recording medium layer above the Curie point in nano-seconds. High density bits can be written on a high coercivity medium with the pole 124' energized by the coils 126' to a modest magnetic field.

The EAMR disk drive 100' may have improved performance and reliability. Using the EAM 140', the cavity of the laser 134' is modulated to output pulsed laser energy provided to the waveguide 122. Because the cavity is modulated, the laser 134' may generate less power/heat as compared to DC operation. In addition, the depth of the modulation provided by the EAM 140' may be greater than that provided by the EAM 140. However, the laser 134' may be subject to jitter. In addition, the EAM 140 of FIG. 2 may provide better temporal control of the pulses. Because the EAM 140' modulates the cavity of the laser 134', pulsed energy is provided to the waveguide 134' and, therefore, to the NFT 128'. The NFT 128' is thus less likely to overheat. Consequently, deformation and other heat related issues for the NFT 128' may be mitigated. In addition, the pulsed energy may result in an improved gradient in the thermal spot size on the media 102'. A narrower track width may thus be achieved. Consequently, performance and reliability of the EAMR disk drive 100' may be enhanced.

Figure 4:
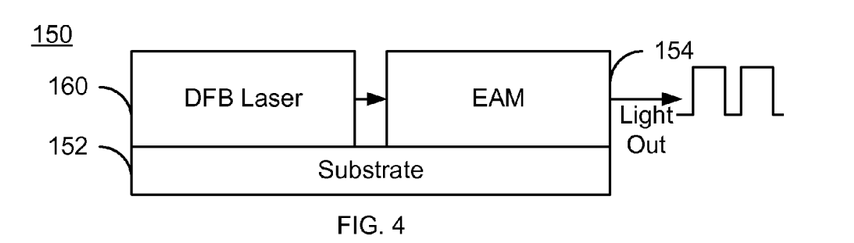
FIG. 4 depicts an exemplary embodiment of a portion of an EAMR disk drive including a laser and electro-absorption modulator.
Figure 5:
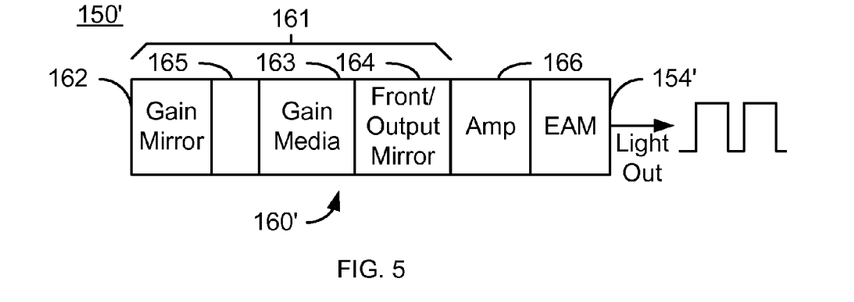
FIG. 5 depicts an exemplary embodiment of a portion of an EAMR disk drive including a laser and electro-absorption modulator
Figure 6:
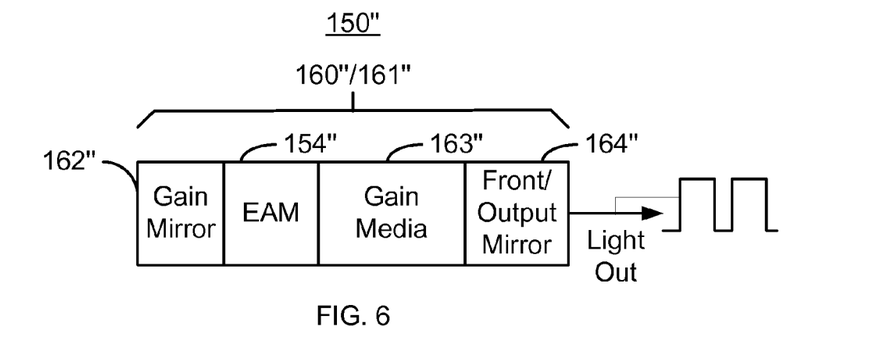
FIG. 6 depicts another exemplary embodiment of a portion of an EAMR disk drive including a laser and electro-absorption modulator.

FIGS. 4-6 depict exemplary embodiments EAMR disk drives 150, 150' and 150" analogous to the EAMR disk drives 100 and 100' and which use edge emitting lasers. FIG. 4 depicts an exemplary embodiment of a portion of an EAMR disk drive 150 that utilizes pulsed laser energy. FIG. 4 is not to scale. Although the EAMR disk drive 150 is depicted in the context of particular components additional, other and/or different components may be used. For clarity, only a portion of the EAMR disk drive 150 is shown. In particular only the laser 160 and EAM 154 are shown. The laser 160 is analogous to the laser 134 and, in the embodiment shown, is a distributed feedback (DFB) edge emitting laser. The EAMR disk drive 150 is analogous to the EAMR disk drive 100. The EAM is thus analogous to the EAM 140 and resides between the output of the laser 160 and the waveguide (not shown). The EAM 154 thus modulates the output of the laser 160, rather than the cavity of the laser 160. However, the EAM 154 and the laser 160 are expressly shown as residing on a single substrate 152. The EAM 154 and laser 160 are thus integrated into a single chip. The EAMR disk drive 150 thus shares the benefits of the EAMR disk drive 100. For example, the EAMR disk drive 150 may have reduced jitter, reduced issues with the NFT (not shown), improved thermal gradient at the media and be capable of writing at higher areal densities. Thus, the EAMR disk drive 150 may have improved performance and reliability.

FIG. 5 depicts another exemplary embodiment of a portion of an EAMR disk drive 150' that utilizes pulsed laser energy. FIG. 5 is not to scale. Although the EAMR disk drive 150' is depicted in the context of particular components additional, other and/or different components may be used. For clarity, only a portion of the EAMR disk drive 150' is shown. In particular only the laser 160' and EAM 154' are shown. The EAMR disk drive 150' is analogous to the EAMR disk drive 100. The EAM 154' is thus analogous to the EAM 140. Thus, the EAM 154' is between the output of the laser 160' and the waveguide (not shown). The EAM 154' thus modulates the output of the laser 160', rather than the cavity of the laser 160'.

The laser 160' is analogous to the laser 134 and, in the embodiment shown, is a sample grating distributed Bragg reflector (SG-DBR) laser. The laser 160' is an edge emitting laser. In addition, portions of the laser cavity 161 are shown. More specifically, the gain mirror 162, gain media 163, a front/output mirror 164, and a phase tuner 165 are shown. The output mirror 164 is typically partially transparent, which allows output of light from the cavity 161. In addition, the amplifier 166 is located adjacent to the EAM 154'.

The EAMR disk drive 150' shares the benefits of the EAMR disk drive 100. For example, the EAMR disk drive 150' may have reduced jitter, reduced issues with the NFT (not shown), improved thermal gradient at the media and be capable of writing at higher areal densities. Thus, the EAMR disk drive 150' may have improved performance and reliability.

FIG. 6 depicts another exemplary embodiment of a portion of an EAMR disk drive 150" that utilizes pulsed laser energy. FIG. 6 is not to scale. Although the EAMR disk drive 150" is depicted in the context of particular components additional, other and/or different components may be used. For clarity, only a portion of the EAMR disk drive 150" is shown. In particular only the laser 160" and EAM 154" are shown. The EAMR disk drive 150" is analogous to the EAMR disk drive 100'. The laser 160" is analogous to the lasers 134'/160/160' and is an edge emitting laser. In addition, portions of the laser cavity 161' are shown. More specifically, the gain mirror 162', gain media 163' and a front/output mirror 164' are shown.

The EAM 154" is also analogous to the EAM 140'. In particular, the EAM 154" is integrated into the laser 160". Modulations to the voltage provided to the EAM 154" modulate the cavity 161" of the laser 160", resulting in the output of the laser 169" being pulsed.

The EAMR disk drive 150" shares the benefits of the EAMR disk drive 100'. For example, the EAMR disk drive 150" may have reduced power dissipated by the laser 160", reduced issues with the NFT (not shown), improved thermal gradient at the media and be capable of writing at higher areal densities. Thus, the EAMR disk drive 150" may have improved performance and reliability.

Figure 7:
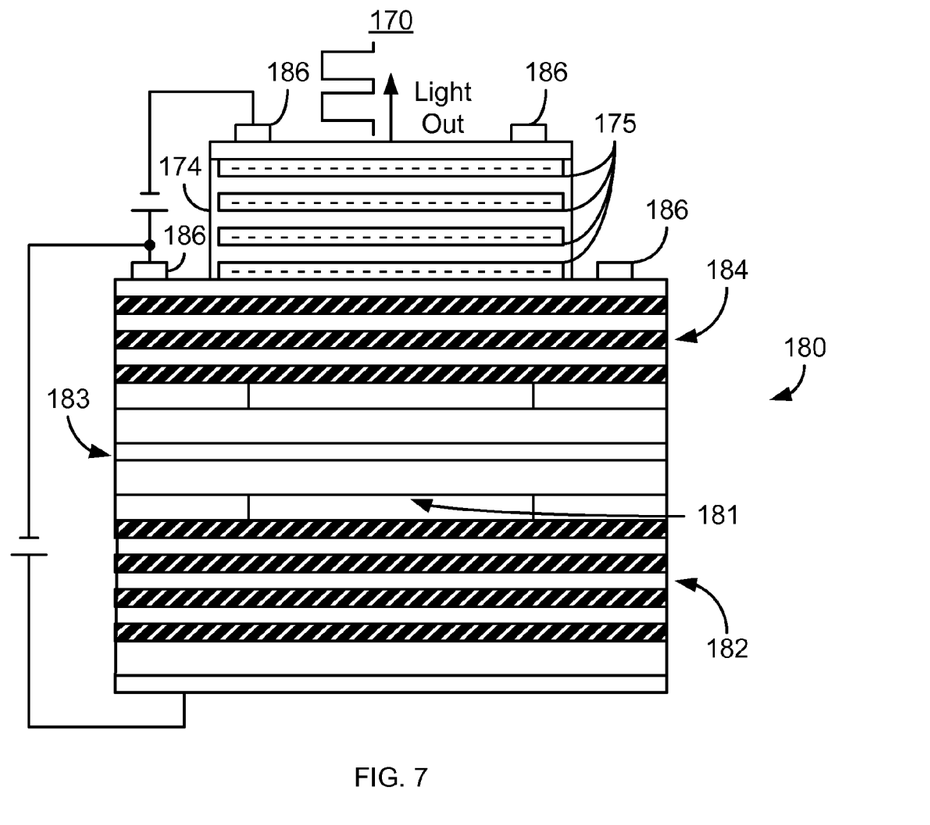
FIG. 7 depicts another exemplary embodiment of a portion of an EAMR disk drive including a laser and electro-absorption modulator.
Figure 8:
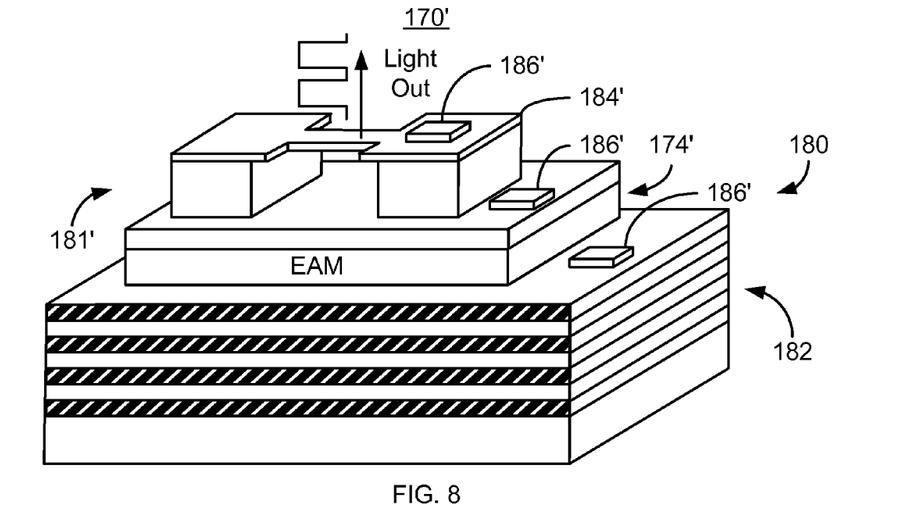
FIG. 8 depicts another exemplary embodiment of a portion of an EAMR disk drive including a laser and electro-absorption modulator.

FIGS. 7-8 depict exemplary embodiments EAMR disk drives 170 and 170' analogous to the EAMR disk drives 100 and 100' and which use VCSELs. FIG. 7 depicts an exemplary embodiment of a portion of an EAMR disk drive 170 that utilizes pulsed laser energy. FIG. 7 is not to scale. Although the EAMR disk drive 170 is depicted in the context of particular components additional, other and/or different components may be used. For clarity, only a portion of the EAMR disk drive 170 is shown. In particular only the laser 180 and EAM 174 are shown. The laser 180 is analogous to the laser 134 and is a VCSEL. The EAMR disk drive 150 is analogous to the EAMR disk drive 100. The EAM 174 is thus analogous to the EAM 140 and resides between the output of the laser 180 and the waveguide (not shown).

The laser 180 includes gain mirror 182 and output mirror 184, which are Bragg reflectors. The laser 180 also includes gain media (quantum wells) 183 and the cavity 181. Also shown are contact pads 186 used in driving the EAM 174 and laser 180. Light from the cavity 181 is thus provided to the EAM 174 via the output mirror 184.

The EAM 174 modulates the output of the laser 180 after the light exits the cavity 181. The EAM 174 may be an edge tunable DBR including the electro-optic media in layers 175 separated by $\lambda/4$, where $\lambda$ is the wavelength of light produced by the laser 180. The EAMR disk drive 170 shares the benefits of the EAMR disk drives 100, 150 and 150'. For example, the EAMR disk drive 170 may have reduced jitter, reduced issues with the NFT (not shown), improved thermal gradient at the media and be capable of writing at higher areal densities. Thus, the EAMR disk drive 170 may have improved performance and reliability.

FIG. 8 depicts another exemplary embodiment of a portion of an EAMR disk drive 170' that utilizes pulsed laser energy. FIG. 8 is not to scale. Although the EAMR disk drive 170' is depicted in the context of particular components additional, other and/or different components may be used. For clarity, only a portion of the EAMR disk drive 170' is shown. In particular only the laser 180' and EAM 174' are shown. The EAMR disk drive 170' is analogous to the EAMR disk drives 100' and 150". The laser 180' is analogous to the lasers 134'/180 and is a VCSEL. The laser 180' thus includes the cavity 181' including gain mirror 182' and output mirror 184'. Also shown are pads 186' analogous to pads 186 depicted in FIG. 7.

The EAM 174' is also analogous to the EAM 140'. In particular, the EAM 174' is integrated into the laser 180'. Modulations to the voltage provided to the EAM 184" modulate the cavity 181' of the laser 180', resulting in a pulsed laser output.

The EAMR disk drive 170' shares the benefits of the EAMR disk drives 100' and 150". For example, the EAMR disk drive 170' may have reduced power dissipated by the laser 160", reduced issues with the NFT (not shown), improved thermal gradient at the media and be capable of writing at higher areal densities. Thus, the EAMR disk drive 170' may have improved performance and reliability.

Figure 9:
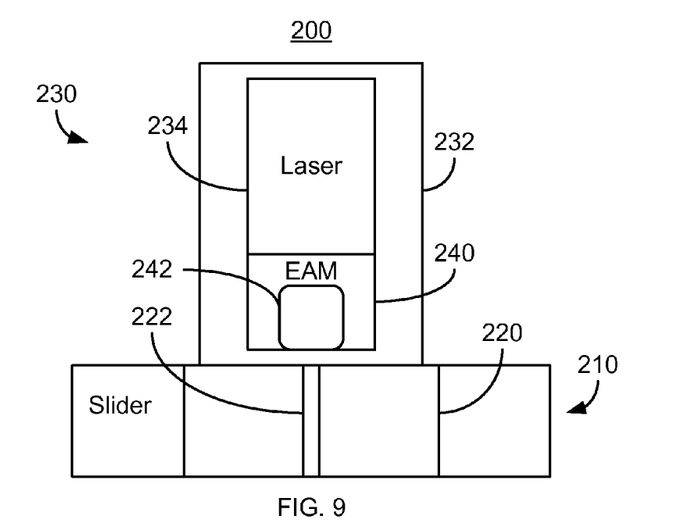
FIG. 9 depicts another exemplary embodiment of a portion of an EAMR disk drive including a laser and electro-absorption modulator.

FIGS. 9-13 depict exemplary embodiments EAMR disk drives 200, 200', 200" and 200''' analogous to the EAMR disk drives 100 and 100' and which use edge emitting lasers. In particular, various mechanisms for integrating the EAM, laser, EAM pads, slider, and EAMR transducer are shown. Further, in other embodiments, other types of lasers may be used. FIG. 9 depicts an exemplary embodiment of a portion of an EAMR disk drive 200 that utilizes pulsed laser energy. FIG. 9 is not to scale. Although the EAMR disk drive 200 is depicted in the context of particular components additional, other and/or different components may be used. For clarity, only a portion of the EAMR disk drive 200 is shown. In particular only the slider 210, EAMR transducer 220 including waveguide 222, and laser assembly 230 including laser 234 and EAM 240 are shown. The laser 234 is analogous to the laser 134 and, in the embodiment shown, is an edge emitting laser. The EAMR disk drive 200 is analogous to the EAMR disk drive 100. The EAM 240 is thus analogous to the EAM 140 and resides between the output of the laser 234 and the waveguide 222. The EAM 240 thus modulates the output of the laser 234, rather than the cavity of the laser 234. However, in an alternate embodiment, the EAM 240 might be incorporated into the cavity of the laser 234. In either embodiment, the EAM 240 and laser 234 may be on a single chip. The EAM electrode 242 is thus located in the laser assembly 240 and may be on the same chip as the laser 234. The laser 234 and EAM 240 may also share a common ground (not explicitly depicted in FIG. 9). In another embodiment the EAM 240 and thus pads 242 may reside on the slider.

The EAMR disk drive 200 may share the benefits of the EAMR disk drive 100 or 100'. For example, the EAMR disk drive 200 may have reduced jitter or reduced laser power consumption, reduced issues with the NFT (not shown), improved thermal gradient at the media and be capable of writing at higher areal densities. Thus, the EAMR disk drive 200 may have improved performance and reliability.

Figure 10:
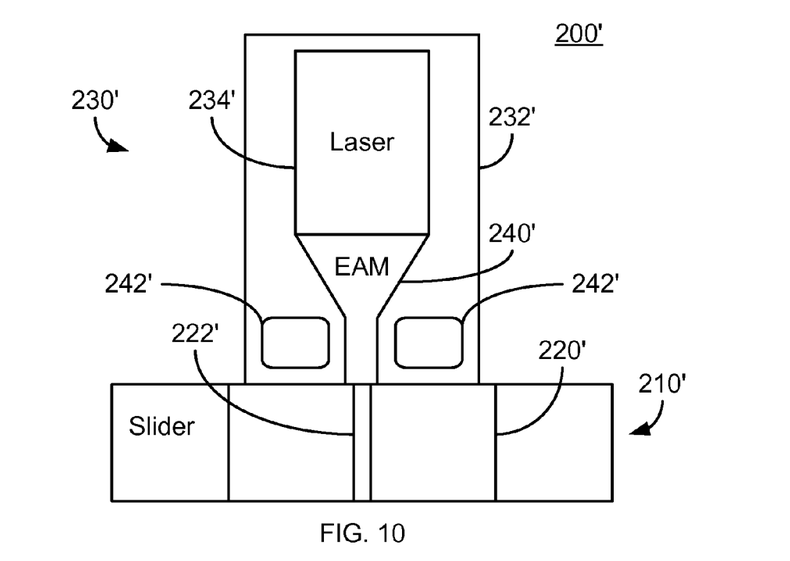
FIG. 10 depicts another exemplary embodiment of a portion of an EAMR disk drive including a laser and electro-absorption modulator.

FIG. 10 depicts another exemplary embodiment of a portion of an EAMR disk drive 200' that utilizes pulsed laser energy. FIG. 10 is not to scale. Although the EAMR disk drive 200' is depicted in the context of particular components additional, other and/or different components may be used. For clarity, only a portion of the EAMR disk drive 200' is shown. In particular only the slider 210', EAMR transducer 220' including waveguide 222', and laser assembly 230' including laser 234' and EAM 240' are shown. The laser 234' is analogous to the lasers 134/234 and, in the embodiment shown, is an edge emitting laser. The EAMR disk drive 200' is analogous to the EAMR disk drive 100. The EAM 240' is thus analogous to the EAM 140 and resides between the output of the laser 234' and the waveguide 222'. The EAM 240' thus modulates the output of the laser 234', rather than the cavity of the laser 234'. The EAM 240' and laser 234' may be on a single chip. In addition, in the embodiment shown, the EAM 240' is tapered. Thus, the EAM 240' may be considered to function as a waveguide for the energy output by the laser 234'. Alternatively, the EAM may be considered to modulated the energy through a tapered waveguide. The EAM electrodes 242' are thus located in the laser assembly 240' and may be on the same chip as the laser 234'. The laser 234' and EAM 240' may also share a common ground (not explicitly depicted in FIG. 10). In another embodiment the EAM 240' and thus pads 242' may be integrated with the slider.

The EAMR disk drive 200' may share the benefits of the EAMR disk drive 100. For example, the EAMR disk drive 200' may have reduced jitter, reduced issues with the NFT (not shown), improved thermal gradient at the media and be capable of writing at higher areal densities. Thus, the EAMR disk drive 200' may have improved performance and reliability.

Figure 11:
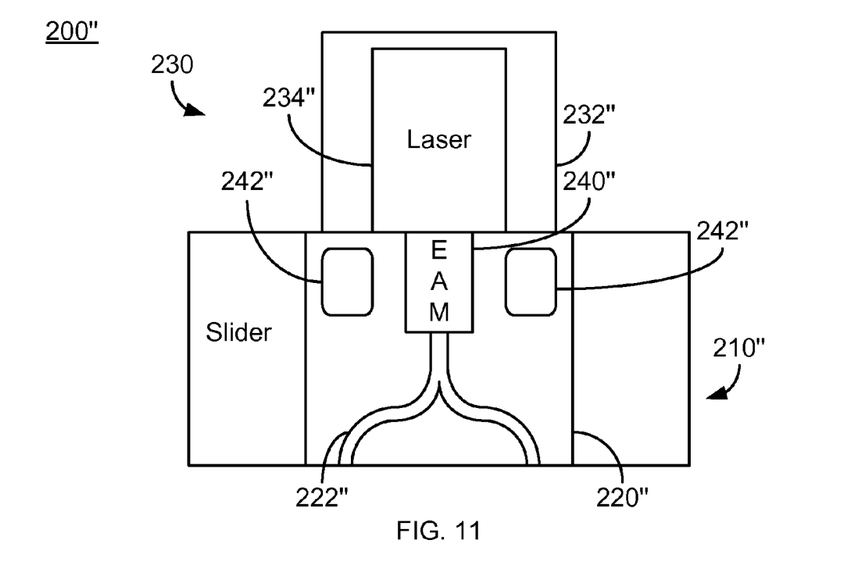
FIG. 11 depicts another exemplary embodiment of a portion of an EAMR disk drive including a laser and electro-absorption modulator.

FIG. 11 depicts another exemplary embodiment of a portion of an EAMR disk drive 200" that utilizes pulsed laser energy. FIG. 11 is not to scale. Although the EAMR disk drive 200" is depicted in the context of particular components additional, other and/or different components may be used. For clarity, only a portion of the EAMR disk drive 200" is shown. In particular only the slider 210", EAMR transducer 220" including waveguide 222", and laser assembly 230" including laser 234" are shown. The laser 234" is analogous to the lasers 134/234/234' and, in the embodiment shown, is an edge emitting laser. The EAMR disk drive 200" is analogous to the EAMR disk drive 100/200/200'. The EAM 240" is thus analogous to the EAM 140 and resides between the output of the laser 234" and the waveguide 222". The EAM 240" thus modulates the output of the laser 234", rather than the cavity of the laser 234". The EAM 240" is integrated into the slider 210". Thus, the EAM electrodes 242" are located on the slider 210". In addition, it is noted that the waveguide 222" has multiple branches. Thus, various configurations of the waveguide 222" and other components may be used in the EAMR disk drive 200".

The EAMR disk drive 200" may share the benefits of the EAMR disk drive 100. For example, the EAMR disk drive 200" may have reduced jitter, reduced issues with the NFT (not shown), improved thermal gradient at the media and be capable of writing at higher areal densities. Thus, the EAMR disk drive 200" may have improved performance and reliability.

Figure 12:
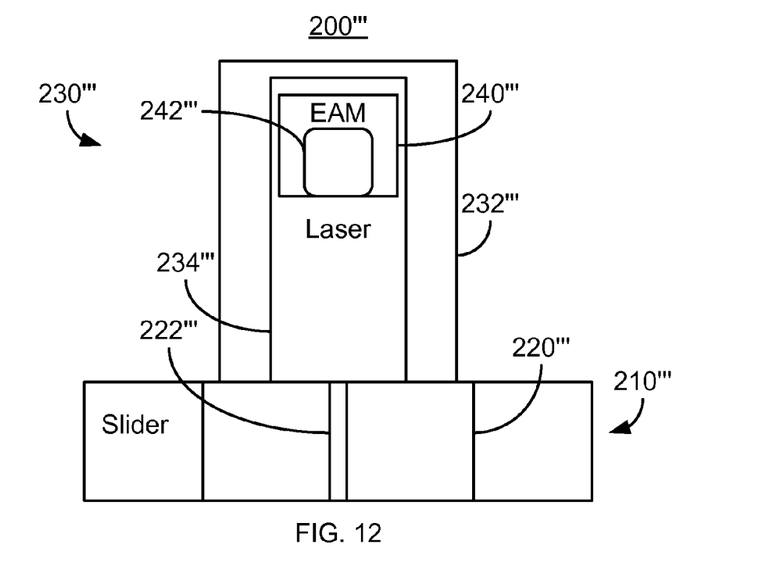
FIG. 12 depicts another exemplary embodiment of a portion of an EAMR disk drive including a laser and electro-absorption modulator.

FIG. 12 depicts an exemplary embodiment of a portion of an EAMR disk drive 200''' that utilizes pulsed laser energy. FIG. 12 is not to scale. Although the EAMR disk drive 200''' is depicted in the context of particular components additional, other and/or different components may be used. For clarity, only a portion of the EAMR disk drive 200''' is shown. In particular only the slider 210''', EAMR transducer 220''' including waveguide 222''', and laser assembly 230'''including laser 234''' are shown. The laser 234''' is analogous to the lasers 134/234/234'.234" and, in the embodiment shown, is an edge emitting laser. The EAMR disk drive 200''' is analogous to the EAMR disk drives 100'/200/200'/200". The EAM 240''' is thus analogous to the EAM 140' and resides in the cavity of the laser 234". The EAM 240''' is integrated into the laser 240''' and thus the laser assembly 230'''. More specifically, the EAM 240''' may be proximate to the gain mirror (not explicitly shown). Consequently, the EAM pads 242''' are located in the laser assembly 230'''.

The EAMR disk drive 200''' may share the benefits of the EAMR disk drive 100'. For example, the EAMR disk drive 200''' may have reduced heat dissipation by the laser, reduced issues with the NFT (not shown), improved thermal gradient at the media and be capable of writing at higher areal densities. Thus, the EAMR disk drive 200''' may have improved performance and reliability.

Figure 13:
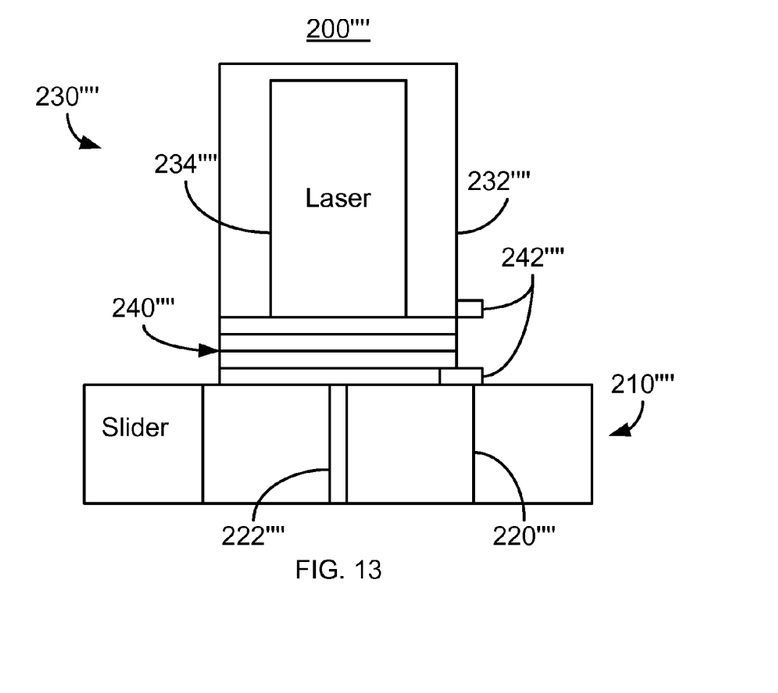
FIG. 13 depicts another exemplary embodiment of a portion of an EAMR disk drive including a laser and electro-absorption modulator.

FIG. 13 depicts an exemplary embodiment of a portion of an EAMR disk drive 200'''' that utilizes pulsed laser energy. FIG. 13 is not to scale. Although the EAMR disk drive 200'''' is depicted in the context of particular components additional, other and/or different components may be used. For clarity, only a portion of the EAMR disk drive 200'''' is shown. In particular only the slider 210'''', EAMR transducer 220'''' including waveguide 222'''', and laser assembly 230'''' including laser 234'''' are shown. The laser 234'''' is analogous to the lasers 134/234/234'/234"/234''' and, in the embodiment shown, is an edge emitting laser. The EAMR disk drive 200'''' is analogous to the EAMR disk drives 100/200/200'/200"/200'''. The EAM 240'''' is thus analogous to the EAM 140 and resides between the cavity of the laser 234'''' and the slider 210. The EAM 240'''' is integrated with the laser 240'''' and thus the laser assembly 230''''. In the embodiment shown, the EAM 240'''' is a MQW or Bragg EAM. In addition, the EAM pads 242'''' are located in the laser assembly 230''''.

The EAMR disk drive 200'''' may share the benefits of the EAMR disk drive 100. For example, the EAMR disk drive 200'''' may have reduced jitter, reduced issues with the NFT (not shown), improved thermal gradient at the media and be capable of writing at higher areal densities. Thus, the EAMR disk drive 200'''' may have improved performance and reliability.

Figure 14:
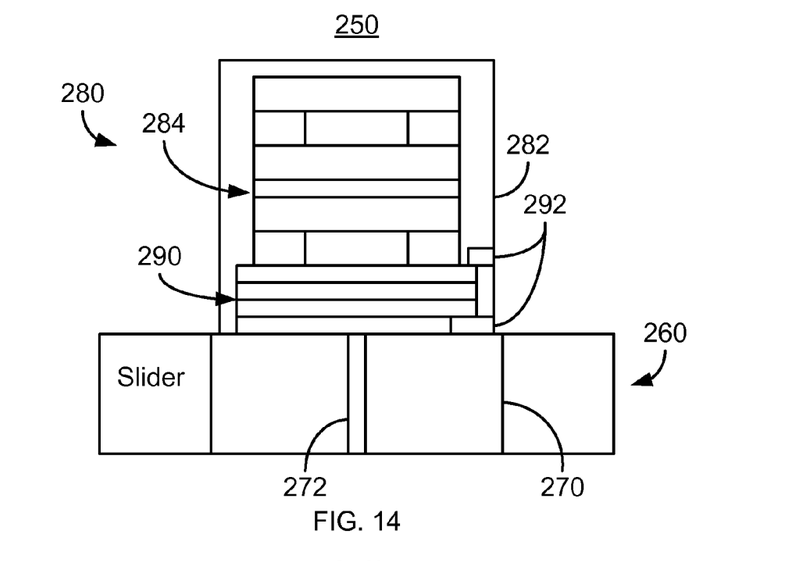
FIG. 14 depicts another exemplary embodiment of a portion of an EAMR disk drive including a laser and electro-absorption modulator.
Figure 15:
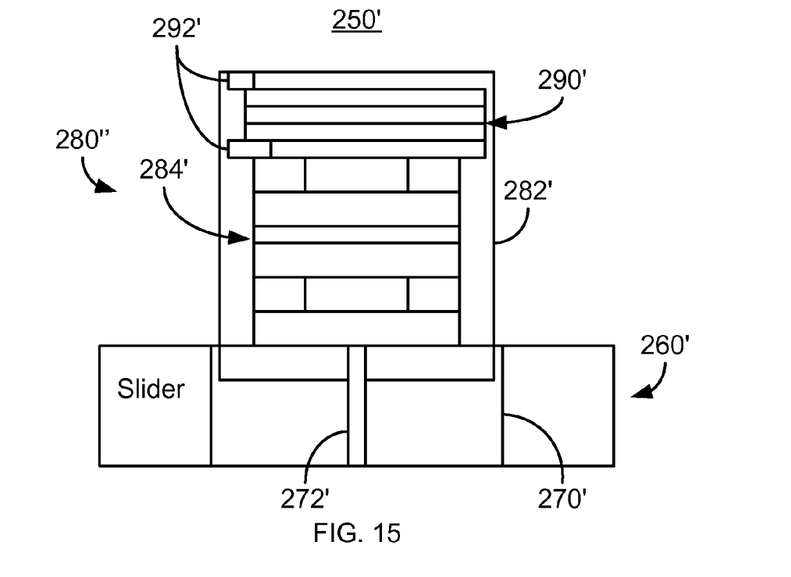
FIG. 15 depicts another exemplary embodiment of a portion of an EAMR disk drive including a laser and electro-absorption modulator.

FIGS. 14-15 depict exemplary embodiments EAMR disk drives 250 and 250' analogous to the EAMR disk drives 100 and 100' and which use VCSELs. In particular, various mechanisms for integrating the EAM, laser, EAM pads, slider, and EAMR transducer are shown. Further, in other embodiments, other types of lasers may be used. FIG. 14 depicts an exemplary embodiment of a portion of an EAMR disk drive 250 that utilizes pulsed laser energy. FIG. 14 is not to scale. Although the EAMR disk drive 250 is depicted in the context of particular components additional, other and/or different components may be used. For clarity, only a portion of the EAMR disk drive 250 is shown. In particular only the slider 260, EAMR transducer 270 including waveguide 272, and laser assembly 280 including submount 282, laser 284 and EAM 290 are shown. The EAMR disk drive 250 is analogous to the EAMR disk drives 100 and 170. The laser 284 is analogous to the laser 180 and, in the embodiment shown, is a VCSEL. The EAM 290 is analogous to the EAM 140/174 and resides between the output of the laser 280 and the waveguide 272. The EAM 290 modulates the output of the laser 284, rather than the cavity of the laser 284. In the embodiment shown, the EAM 290 is a MQW or Bragg EAM. In addition, the EAM pads 292 are located in the laser assembly 280. The EAM 290, laser 284 and EAM pads 292 may be on a single chip.

The EAMR disk drive 250 may share the benefits of the EAMR disk drives 100 and 170. For example, the EAMR disk drive 250 may have reduced jitter or reduced laser power consumption, reduced issues with the NFT (not shown), improved thermal gradient at the media and be capable of writing at higher areal densities. Thus, the EAMR disk drive 250 may have improved performance and reliability.

FIG. 15 depicts an exemplary embodiment of a portion of an EAMR disk drive 250' that utilizes pulsed laser energy. FIG. 15 is not to scale. Although the EAMR disk drive 250' is depicted in the context of particular components additional, other and/or different components may be used. For clarity, only a portion of the EAMR disk drive 250' is shown. In particular only the slider 260', EAMR transducer 270' including waveguide 272', and laser assembly 280' including submount 282', laser 284' and EAM 290' are shown. The EAMR disk drive 250' is analogous to the EAMR disk drives 100' and 170'. The laser 284' is analogous to the laser 180/174 and, in the embodiment shown, is a VCSEL. The EAM 290' is analogous to the EAM 174' and resides within the cavity of the laser 280'. The EAM 290' modulates the cavity of the laser 284'. In the embodiment shown, the EAM 290' is a MQW or Bragg EAM. In addition, the EAM pads 292' are located in the laser assembly 280'. The EAM 290', laser 284' and EAM pads 292 may be on a single chip.

The EAMR disk drive 250' may share the benefits of the EAMR disk drives 100' and 170'. For example, the EAMR disk drive 250' may have reduced laser power consumption, reduced issues with the NFT (not shown), improved thermal gradient at the media and be capable of writing at higher areal densities. Thus, the EAMR disk drive 250' may have improved performance and reliability.

Figure 16:
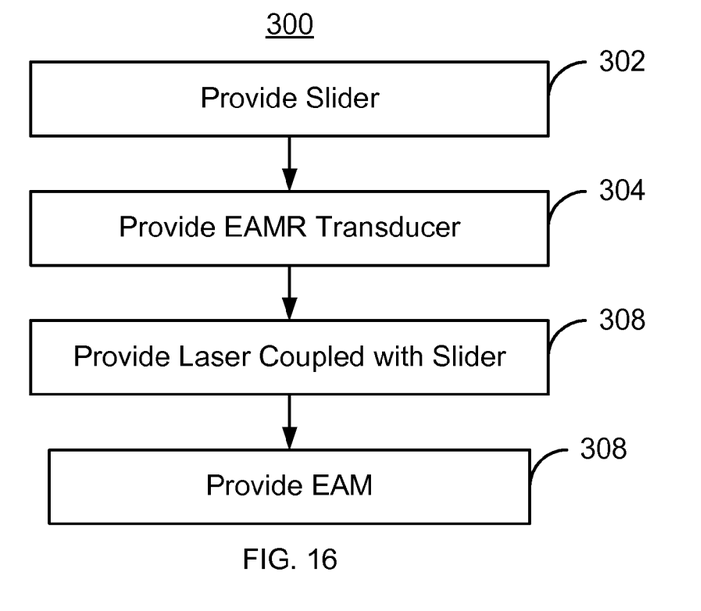
FIG. 16 depicts an exemplary embodiment of a method of forming a portion of an EAMR disk drive including an electro-absorption modulator.

FIG. 16 depicts an exemplary embodiment of a method 300 of forming a portion of an EAMR disk drive. For simplicity, some steps may be omitted, combined, replaced, performed in another sequence, and/or interleaved. The method 300 is described in the context of the EAMR disk drives 100/100'. However, the method 300 may be used for other EAMR disk drives. The method 300 also may commence after formation of some portions of the EAMR disk drive 100/100'. The method 300 is also described in the context of providing a single disk drive. However, the method 300 may be used to fabricate multiple disk drives at substantially the same time.

A slider 110/110' is provided, via step 302. The EAMR head 120/120' is provided on the slider 110/110', via step 304. Step 304 includes fabricating the structures for the EAMR head such as the waveguide 122/122', the write pole 124/124', the coil(s) 126/126' and the NFT 128/128'. In other embodiments, other or different components may be fabricated as part of step 304. The laser 134/134' is also provided, via step 306. Step 306 may include obtaining the desired laser 134/134' and affixing the laser to the submount 132/132'. Thus, the laser provided in step 306 may be an edge emitting laser, a VCSEL or other laser.

One or more EAM(s) 140/140' optically coupled with the laser 134/134' and with coupled with the slider 110/110' are provided, via step 308. Step 308 may include integrating the EAM 140' within the laser 134'. Alternatively, the EAM 140 may be located between the output of the laser 134 and the waveguide 122.

Thus, using the method 300, the disk drives 100/100' may be provided. The method 300 may also be used to provide one or more of the disk drives 150, 150', 150", 170, 170', 200, 200', 200", 200"', 200"", 250 and/or 250'. As a result, the benefits of the disk drives 100, 100', 150, 150', 150", 170, 170', 200, 200', 200", 200"', 200"", 250 and/or 250' may be achieved.

I claim:

1. An energy assisted magnetic recording (EAMR) disk drive including a media comprising:
    a slider;
    at least one laser coupled with the slider, the at least one laser including at least one laser resonance cavity;
    at least one electro-optical modulator (EAM) optically coupled with the at least one laser and coupled with the slider, the at least one laser and the at least one EAM providing a pulsed energy output by at least one of the EAM modulating a laser signal output from the at least one laser such that the EAM outputs the pulsed energy output and the EAM modulating the at least one laser resonance cavity such that the at least one laser provides the pulsed energy output; and
    at least one EAMR head on the slider, the at least one EAMR head including at least one waveguide, a write pole, and at least one coil for energizing the write pole, the at least one waveguide for receiving the pulsed energy output and directing the pulsed energy output toward the media.

2. The EAMR disk drive of claim 1 wherein the at least one laser resonance cavity includes a gain mirror and an output mirror and wherein the EAM is integrated into the at least one laser resonance cavity between the gain mirror and the output mirror, the EAM modulating the laser resonance cavity.

3. The EAMR disk drive of claim 2 wherein the at least one laser is selected from at least one edge emitting laser and at least one vertical surface emitting laser.

4. The EAMR disk drive of claim 2 further comprising:
    a plurality of electrodes electrically coupled with the EAM.

5. The EAMR disk drive of claim 4 wherein the plurality of electrodes are integrated onto the slider.

6. The EAMR disk drive of claim 4 further wherein the laser is integrated into a laser chip and wherein the plurality of electrodes are coupled with the laser chip.

7. The EAMR disk drive of claim 2 wherein the EAM is a Bragg EAM.

8. The EAMR disk drive of claim 1 wherein the at least one EAM resides between the at least one laser and the slider.

9. The EAMR disk drive of claim 8 wherein the at least one laser is selected from at least one edge emitting laser and at least one vertical surface emitting laser.

10. The EAMR disk drive of claim 8 further comprising:
    a plurality of electrodes electrically coupled with the EAM.

11. The EAMR disk drive of claim 10 wherein the plurality of electrodes are integrated onto the slider.

12. The EAMR disk drive of claim 10 wherein the laser is integrated into a laser chip and wherein the plurality of electrodes are coupled with the laser chip.

13. An energy assisted magnetic recording (EAMR) disk drive including a media comprising:
    a slider;
    at least one laser coupled with the slider;
    at least one electro-optical modulator (EAM) optically coupled with the at least one laser and coupled with the slider, the at least one laser and the at least one EAM providing a pulsed energy output, the at least one EAM residing between the at least one laser and the slider;

a plurality of electrodes electrically coupled with the EAM; and at least one EAMR head on the slider, the at least one EAMR head including at least one waveguide, a write pole, and at least one coil for energizing the write pole, the at least one waveguide for receiving the pulsed energy output and directing the pulsed energy output toward the media;

wherein the laser is integrated into a laser chip and wherein the plurality of electrodes are coupled with the laser chip; and wherein the EAM is a tapered EAM.

14. The EAMR disk drive of claim 12 further comprising:
a tapered waveguide between the laser and the slider, the EAM being coupled with a portion of the tapered waveguide.

15. The EAMR disk drive of claim 8 wherein the EAM is a Bragg EAM.

16. An energy assisted magnetic recording (EAMR) disk drive including a media comprising:
a slider;
an integrated laser package coupled with the slider, the integrated laser package including a laser, an electro-optical modulator (EAM) optically coupled with the laser, and a plurality of contacts for providing voltage to the EAM, the laser including at least one laser resonance cavity, the laser and the EAM providing a pulsed energy output by at least one of the EAM modulating a laser signal output by the laser such that the EAM provides the pulsed energy output and the EAM modulating the laser resonance cavity such that the laser outputs the pulsed energy output, the laser being selected from an edge emitting laser and a vertical surface emitting laser; and
an EAMR head on the slider, the EAMR head including a waveguide, a write pole, and at least one coil for energizing the write pole, the waveguide for receiving the pulsed energy output and directing the pulsed energy output toward the media.

17. The EAMR disk drive of claim 16 wherein the laser includes a resonance cavity having a gain mirror and an output mirror and wherein the EAM is integrated into the resonance cavity between the gain mirror and the output mirror.

18. The EAMR disk drive of claim 16 wherein the EAM resides between the laser and the slider.

19. A method for providing an energy assisted magnetic recording (EAMR) disk drive including a media, the method comprising:
providing a slider;
providing at least one laser coupled with the slider, the at least one laser including at least one laser resonance cavity;
providing at least one electro-optical modulator (EAM) optically coupled with the at least one laser and coupled with the slider, the at least one laser and the at least one EAM providing a pulsed energy output by at least one of the EAM modulating a laser signal output by the at least one laser such that the EAM provides the pulsed energy output and the EAM modulating the laser resonance cavity such that the at least one laser outputs the pulsed energy output; and
providing at least one EAMR head on the slider, the at least one EAMR head including at least one waveguide, a write pole, and at least one coil for energizing the write pole, the at least one waveguide for receiving the pulsed energy output and directing the pulsed energy output toward the media.

20. The method of claim 19 wherein the at least one laser includes a resonance cavity having a gain mirror and an output mirror and wherein the EAM is integrated into the resonance cavity between the gain mirror and the output mirror.

21. The method of claim 20 wherein the at least one laser is selected from at least one edge emitting laser and at least one vertical surface emitting laser.

22. The method of claim 20 further comprising:
providing a plurality of electrodes electrically coupled with the EAM.

23. The method of claim 22 wherein the plurality of electrodes are integrated onto the slider.

24. The method of claim 22 wherein the laser is integrated into a laser chip and wherein the plurality of electrodes are coupled with the laser chip.

25. The method of claim 20 wherein the EAM is a Bragg EAM.

26. The method of claim 19 wherein the at least one EAM resides between the at least one laser and the slider.

27. The method of claim 26 wherein the at least one laser is selected from at least one edge emitting laser and at least one vertical surface emitting laser.

28. The method of claim 27 further comprising:
providing a plurality of electrodes electrically coupled with the EAM.

29. The method of claim 28 wherein the plurality of electrodes are integrated onto the slider.

30. The method of claim 28 wherein the laser is integrated into a laser chip and wherein the plurality of electrodes are coupled with the laser chip.

31. A method for providing an energy assisted magnetic recording (EAMR) disk drive including a media, the method comprising:
providing a slider;
providing at least one laser coupled with the slider, the at least one laser being selected from at least one edge emitting laser and at least one vertical surface emitting laser;
providing at least one electro-optical modulator (EAM) optically coupled with the at least one laser and coupled with the slider, the at least one laser and the at least one EAM providing a pulsed energy output, the at least one EAM residing between the at least one laser and the slider, wherein the EAM is a tapered EAM;
providing a plurality of electrodes electrically coupled with the EAM, the plurality of electrodes being integrated onto the slider; and
providing at least one EAMR head on the slider, the at least one EAMR head including at least one waveguide, a write pole, and at least one coil for energizing the write pole, the at least one waveguide for receiving the pulsed energy output and directing the pulsed energy output toward the media.

32. The method of claim 28 further comprising:
providing a tapered waveguide adjoining between the laser and the EAM, the EAM being coupled with a portion of the tapered waveguide.

33. The method of claim 28 wherein the EAM is a Bragg EAM.

34. The EAMR disk drive of claim 1 wherein the EAM is a tapered EAM.

35. The EAMR disk drive of claim 16 wherein the EAM is a tapered EAM.

36. The method of claim 19 wherein the EAM is a tapered EAM.

* * * * *